United States Patent [19]
Peters et al.

[11] Patent Number: 5,905,841
[45] Date of Patent: May 18, 1999

[54] ELECTRONIC FILM EDITING SYSTEM USING BOTH FILM AND VIDEOTAPE FORMAT

[75] Inventors: Eric C. Peters, Carlisle; Patrick D. O'Connor, Framingham; Michael E. Phillips, Brookline, all of Mass.

[73] Assignee: Avid Technology, Inc., Tewsbury, Mass.

[21] Appl. No.: 08/393,886

[22] Filed: Feb. 24, 1995

Related U.S. Application Data

[63] Continuation of application No. 07/908,192, Jul. 1, 1992, abandoned.

[51] Int. Cl.$^6$ ................................................. H04N 5/76
[52] U.S. Cl. ........................... 386/52; 386/129; 348/96
[58] Field of Search .................................. 358/335, 311, 358/310; 360/3, 14.1, 14.2, 14.3; 348/96, 97, 107, 441, 446; 386/4, 35, 52, 64, 40, 129, 124, 131; 345/328; H04N 9/11, 9/79, 5/76, 5/78, 7/12, 3/36, 5/253, 3/40

[56] References Cited

U.S. PATENT DOCUMENTS 2,927,154  3/1960  Wolfe et al. .
3,184,542  5/1965  Horsley .

(List continued on next page.)

FOREIGN PATENT DOCUMENTS

| 0 113 993 | 7/1984 | European Pat. Off. . |
| 0 438 299 A2 | 7/1991 | European Pat. Off. . |
| 0481446 | 4/1992 | European Pat. Off. . |
| 0 515 031 A2 | 11/1992 | European Pat. Off. . |
| 2 235 815 | 3/1991 | United Kingdom . |
| WO 93/21588 | 10/1993 | WIPO . |

OTHER PUBLICATIONS

Mark J. Norton, "A Visual EDL System".
Frank Davidoff, "The All–Digital Television Studio", SMPTE Journal, Jun. 1980, vol. 89, No. 6.

Milt Leonard, "Silicon Solution Solution Merges Video, Stills, and Voice", Electronic Design, Apr. 2, 1992.

P. Venkat Rangan, Harric M. Vin, Kashun Chan and Ingvar A. Aaberg, "A Window–Based Editor For Digital Video and Audio", 1992 IEEE, pp. 640–648.

Charles A. Pantuso, "Reducing Financial Aliasing in HDTV Production", Better Video Images, 23rd Annual SMPTE Television Conference in San Francisco, CA Feb. 3–4, 1989.

S. Dickson & B. Villarreal, "The Gemini Process: A Theatrical–Quality Video–to–Film Transfer Process", Better Video Images, 23rd Annual SMPTE Television Conference, Feb. 1989, San Francisco, CA, pp. 30–35 *.

M. Kary, "Video–Assisted Film Editing System", SMPTE Journal, Jun. 1982, pp. 547–551 *.

S. Dickson & B. Villarreal, "The Gemini Process: A Theatrical–Quality Video–to Film Transfer Process", Better Video Images, 23rd Annual SMPTE Television Conference, Feb. 1989, San Francisco, CA, pp. 30–35.

M. Kary, "Video–Assisted Film Editing System", SMPTE Journal, Jun. 1982, pp. 547–551.

Becker, Stanley D., "Simultaneous Release On Film and Tape OFF–LINE EDLs", Nov. 1988, BME.

*Primary Examiner*—Thai Tran
*Attorney, Agent, or Firm*—Wolf, Greenfield & Sacks, P.C.

[57] ABSTRACT

A system for generating a digital representation of a video signal comprised of a sequence of video frames which each include two video fields of a duration such that the video plays at a first prespecified rate of frames per second. The sequence of video frames includes a prespecified number of redundant video fields. Redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

23 Claims, 7 Drawing Sheets

U.S. PATENT DOCUMENTS

| | | |
|---|---|---|
| 3,740,463 | 6/1973 | Youngstrom et al. . |
| 3,748,381 | 7/1973 | Strobele et al. . |
| 3,824,336 | 7/1974 | Gould et al. . |
| 3,925,815 | 12/1975 | Lemelson . |
| 4,040,098 | 8/1977 | Beeson et al. . |
| 4,100,607 | 7/1978 | Skinner . |
| 4,179,712 | 12/1979 | Opelt . |
| 4,213,163 | 7/1980 | Lemelson . |
| 4,283,745 | 8/1981 | Kuper et al. . |
| 4,295,154 | 10/1981 | Hata et al. . |
| 4,390,904 | 6/1983 | Johnston et al. . |
| 4,413,289 | 11/1983 | Weaver et al. . |
| 4,500,908 | 2/1985 | Mandeberg . |
| 4,538,188 | 8/1985 | Barker et al. . |
| 4,612,569 | 9/1986 | Ichinose . |
| 4,675,755 | 6/1987 | Baumeister et al. . |
| 4,685,003 | 8/1987 | Westland . |
| 4,689,683 | 8/1987 | Efron . |
| 4,698,682 | 10/1987 | Astle . |
| 4,746,994 | 5/1988 | Ettlinger . |
| 4,750,050 | 6/1988 | Belmares-Sarabia et al. . |
| 4,752,834 | 6/1988 | Koombes . |
| 4,754,342 | 6/1988 | Duffy . |
| 4,755,889 | 7/1988 | Schwartz . |
| 4,777,537 | 10/1988 | Ueno et al. . |
| 4,785,349 | 11/1988 | Keith et al. . |
| 4,792,864 | 12/1988 | Watanabe et al. . |
| 4,823,285 | 4/1989 | Blancato . |
| 4,837,638 | 6/1989 | Fullwood . |
| 4,841,503 | 6/1989 | Yamada et al. . |
| 4,851,906 | 7/1989 | Koga et al. ............................ 358/136 |
| 4,864,429 | 9/1989 | Eigeldinger et al. . |
| 4,879,611 | 11/1989 | Fukui et al. . |
| 4,891,715 | 1/1990 | Levy . |
| 4,918,523 | 4/1990 | Simon et al. . |
| 4,935,816 | 6/1990 | Faber . |
| 4,937,685 | 6/1990 | Barker et al. . |
| 4,942,476 | 7/1990 | Koga et al. ............................ 358/136 |
| 4,949,193 | 8/1990 | Kiesel . |
| 4,953,024 | 8/1990 | Caronna ................................ 358/136 |
| 4,964,004 | 10/1990 | Barker . |
| 4,969,042 | 11/1990 | Houtman et al. . |
| 4,970,663 | 11/1990 | Bedell et al. . |
| 4,972,274 | 11/1990 | Becker et al. . |
| 4,974,178 | 11/1990 | Izeki et al. . |
| 4,979,050 | 12/1990 | Westland et al. . |
| 4,989,191 | 1/1991 | Kuo . |
| 5,006,939 | 4/1991 | Cawley . |
| 5,045,940 | 9/1991 | Peters et al. . |
| 5,099,337 | 3/1992 | Cury . |
| 5,109,482 | 4/1992 | Bohrman . |
| 5,119,188 | 6/1992 | McCalley et al. . |
| 5,121,470 | 6/1992 | Trautman . |
| 5,134,496 | 7/1992 | Schwab et al. ........................ 358/335 |
| 5,138,440 | 8/1992 | Radice . |
| 5,138,459 | 8/1992 | Roberts et al. . |
| 5,182,771 | 1/1993 | Munich et al. ............................ 380/5 |
| 5,192,999 | 3/1993 | Graczyk et al. . |
| 5,206,929 | 4/1993 | Langford et al. . |
| 5,231,501 | 7/1993 | Sakai . |
| 5,233,453 | 8/1993 | Funahashi et al. . |
| 5,249,056 | 9/1993 | Foung et al. ........................... 358/214 |
| 5,255,083 | 10/1993 | Capitant et al. ........................ 358/527 |
| 5,255,091 | 10/1993 | Lyon et al. ............................... 358/54 |
| 5,257,113 | 10/1993 | Chen et al. ............................. 358/426 |
| 5,260,787 | 11/1993 | Capitant et al. ........................ 358/140 |
| 5,262,877 | 11/1993 | Otsuka . |
| 5,267,351 | 11/1993 | Reber et al. . |
| 5,321,500 | 6/1994 | Capitant et al. . |
| 5,384,667 | 1/1995 | Beckwith . |
| 5,388,197 | 2/1995 | Rayner ................................... 395/154 |
| 5,390,028 | 2/1995 | Kobayashi et al. . |
| 5,459,529 | 10/1995 | Searby et al. . |
| 5,506,932 | 4/1996 | Holmes et al. . |

FIG. 4

| RECORD N° | EVENT | CAMROLL | SOUNDROLL | DOP | SCENE | TAKE | VTIC_IN(50) | VTIC_OUT(52) | DURATION |
|---|---|---|---|---|---|---|---|---|---|
| 1 | 0 | | | / / | | | | | 00:00:00 |
| 2 | 1 | A10 | | 05/28/92 | 87 | 1 | 04:00:05:25 | 04:01:23:25 | 01:18:00 |
| 3 | 2 | A10 | | 05/28/92 | 87A | 1 | 04:01:24:00 | 04:03:05:05 | 01:41:05 |
| 4 | 3 | A10 | | 05/28/92 | 87A | 4 | 04:03:07:11 | 04:03:26:06 | 00:18:25 |
| 5 | 4 | A12 | | 05/28/92 | A51 | 5 | 04:03:26:13 | 04:04:48:09 | 01:21:26 |
| 6 | 5 | A12 | 16 | 05/28/92 | A51 | 3 | 04:04:51:01 | 04:05:03:26 | 00:12:25 |
| 7 | 6 | A11 | | 05/28/92 | 57 | 5 | 04:06:41:08 | 04:07:00:05 | 00:18:27 |
| 8 | 9 | A11 | 15 | 05/28/92 | 57 | 6 | 04:08:05:14 | 04:09:27:10 | 01:21:26 |
| 9 | 9 | A11 | 15 | 05/28/92 | 57 | 8 | 04:11:02:09 | 04:12:20:08 | 01:17:29 |
| 10 | 10 | A11 | | 05/28/92 | 68 | 2 | 04:14:26:05 | 04:15:44:06 | 00:00:00 |
| 11 | 12 | A15 | 16 | 05/28/92 | 91 | 3 | 04:16:41:13 | 04:18:03:14 | 00:00:00 |
| 12 | 13 | A15 | 16 | 05/28/92 | 32 | 1 | 04:20:14:06 | 04:21:19:14 | 00:00:00 |

| RECORD N° | NAGRA_IN | VTIC_DROP | NAGRA_DROP | KEYIN(54) | KEYOUT(56) | PULLIN(58) | PULLOUT FC(60) |
|---|---|---|---|---|---|---|---|
| 1 | | .F. | .F. | | | | |
| 2 | | .F. | .F. | KJ158165032812 | KJ158165044512 | AA | AA |
| 3 | | .F. | .F. | KJ158165044600 | KJ158165059112 | AA | AA |
| 4 | | .F. | .F. | KJ158165060101 | KJ158165062905 | BB | BB |
| 5 | 16:12:18:13 | .F. | .F. | KJ058204062910 | KJ058204075207 | CC | DD |
| 6 | | .F. | .F. | KJ058204075609 | KJ058204077513 | BB | BB |
| 7 | | .F. | .F. | KJ058171092114 | KJ058171095004 | CC | AA |
| 8 | 16:48:50:01 | .F. | .F. | KJ058171104803 | KJ058171117100 | DD | AA |
| 9 | 10:30:47:24 | .F. | .F. | KJ058171114707 | KJ058171926406 | DD | CC |
| 10 | | .F. | .F. | KJ058171945304 | KJ058171957005 | AA | BB |
| 11 | 10:45:13:13 | .F. | .F. | KJ058171965602 | KJ058171977903 | CC | DD |
| 12 | 13:35:25:07 | .F. | .F. | KJ058171997505 | KJ058171007303 | BB | DD |

| | NAME | TRACKS | START | KN START | END | KN END | DURATION |
|---|---|---|---|---|---|---|---|
| | | | | THEY CAME BIN | | | |
| ☒ | 32/7 | V A1 A2 | 04:20:14:06 | KJ058171-9975+05 | 04:21:19:14 | 73+03 | 1:05:08 |
| ☒ | A51/3 | V | 04:04:51:01 | KJ058204-0756+09 | 04:05:03:26 | 775+13 | 12:25 |
| ☒ | A51/5 | V A1 A2 | 04:03:26:13 | KJ058204-0629+10 | 04:04:48:09 | 752+07 | 1:21:26 |
| ☒ | 57/5 | V | 04:06:41:08 | KJ058171-0921+14 | 04:07:00:05 | 950+04 | 18:28 |
| ☒ | 57/6 | V A1 A2 | 04:08:05:14 | KJ058171-1048+03 | 04:09:27:10 | 171+00 | 1:21:26 |
| ☒ | 57/8 | V A1 A2 | 04:11:02:09 | KJ058171-9147+07 | 04:12:20:08 | 264+06 | 1:17:29 |
| ☒ | 68/2 | V | 04:14:26:05 | KJ058171-9453+04 | 04:15:44:06 | 570+05 | 1:18:01 |
| ☒ | 87/1 | V | 04:00:05:25 | KJ158165-0328+12 | 04:01:23:25 | 445+12 | 1:18:00 |
| ☒ | 87A/1 | V | 04:01:24:00 | KJ158165-0446+00 | 04:03:05:05 | 597+12 | 1:41:05 |
| ☒ | 87A/4 | V | 04:03:07:11 | KJ158165-0601+01 | 04:03:26:06 | 629+05 | 18:25 |
| ☒ | 91/3 | V A1 A2 | 04:16:41:13 | KJ058171-9656+02 | 04:18:03:14 | 779+03 | 1:22:01 |

FIG. 5

ELECTRONIC FILM EDITING SYSTEM USING BOTH FILM AND VIDEOTAPE FORMAT

This application is a continuation of application Ser. No. 07/908,192, filed Jul. 1, 1992, now abandoned.

BACKGROUND OF THE INVENTION

This invention relates to techniques for electronically editing film.

Film video and audio source material is frequently edited digitally using a computer system, such as the Avid/1 Media Composer from Avid Technology, Inc., of Tewksbury, Mass., which generates a digital representation of a source film, allowing a film editor to edit the digital version, rather than the film source itself. This editing technique provides great precision and flexibility in the editing process, and is thus gaining popularity over the old style of film editing using a flatbed editor.

The Avid/1 Media Composer accepts a videotape version of a source film, created by transferring the film to videotape using the so-called telecine process, and digitizes the videotape version for editing via manipulation by computer. The operation of the Media Composer is described more fully in copending application U.S. Ser. No. 07/866,829, filed Apr. 10, 1992, and entitled Improved Media Composer. The teachings of that application are incorporated herein by reference. Editing of the digitized film version is performed on the Media Composer computer using CRT monitors for displaying the digitized videotape, with the edit details being based on videotape timecode specifications. Once editing is complete, the Media Composer creates an edited videotape and a corresponding edit decision list (EDL) which documents the videotape timecode specification details of the edited videotape. The film editor uses this EDL to specify a cut and assemble list for editing the source film. While providing many advantages over the old style flatbed film editing technique, this electronic editing technique is found to be cumbersome for some film editors who are unaccustomed to videotape timecode specifications.

SUMMARY OF THE INVENTION

In general, in one aspect, the invention provides a system for generating a digital representation of a video signal comprised of a sequence of video frames which each include two video fields of a duration such that the video plays at a first prespecified rate of frames per second. The sequence of video frames includes a prespecified number of redundant video fields. In the invention, redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

In preferred embodiments, the invention further provides for storing the digitized representation of the video signal on a digital storage apparatus. The redundant video fields are identified by assigning a capture mask value to each video field in the video frame sequence, the capture mask value of a field being a "0" if the field is redundant, and the capture mask value of a field being a "1" for all other video fields. A video frame grabber processes the video frame sequence based on the capture mask values to exclude the identified redundant video frames from being digitized. The video compressor compresses the video frames based on JPEG video compression.

In other preferred embodiments, the first prespecified video play rate is 29.97 frames per second and the second prespecified digital video play rate is 24 frames per second. The rate of the analog video signal is increased from 29.97 frames per second to 30 frames per second before the step of digitizing the video frame sequence. In further preferred embodiments, the analog video signal is a video representation of film shot at 24 frames per second, and the digital video play rate of 24 frames per second corresponds to the 24 frames per second film shooting rate. The analog video signal is a representation of film that is transferred to the video representation using a telecine apparatus.

In general, in another aspect, the invention provides an electronic editing system for digitally editing film shot at a first prespecified rate and converted to an analog video representation at a second prespecified rate. The editing system includes analog to digital converting circuitry for accepting the analog video representation of the film, adjusting the rate of the analog video such that the rate corresponds to the first prespecified rate at which the film was shot, and digitizing the adjusted analog video to generate a corresponding digital representation of the film. Further included is a digital storage apparatus for storing the digital representation of the film, and computing apparatus for processing the stored digital representation of the film to electronically edit the film and correspondingly edit the stored digital representation of the film.

In preferred embodiments, the system further includes digital to analog converting circuitry for converting the edited digital representation of the film to an analog video representation of the film, adjusting the rate of the analog video from the first prespecified rate to the second prespecified video rate, and outputting the adjusted analog video. Preferably, the analog video representation of the film accepted by the analog to digital converting circuity is an NTSC videotape. The apparatus for storing the digital representation of the film also stores a digitized version of a film transfer log corresponding to the digital representation of the film. The system includes display apparatus for displaying the digitized version of the film as the film is electronically edited and displaying a metric for tracking the location of a segment of the film as the segment is displayed, the metric being based on either film footage code or video time code, as specified by the system user.

The electronic editing system of the invention allows users to provide the system with film formatted on standard videotapes, NTSC tapes, for example, and yet allows the video to be digitally edited as if it were film, i.e., running at film speed, as is preferred by most film editors. By reformatting the analog video as it is digitized, the system provides the ability to electronically edit film based on the same metric used in conventional film editing.

BRIEF DESCRIPTION OF THE DRAWINGS

FIG. 4 is an Evertz Film Transfer Log produced by the telecine transfer system and processed by the editing system of the invention.

FIG. 5 is an illustration of a video screen showing the electronic bin generated by the editing system of the invention.

DESCRIPTION OF THE PREFERRED EMBODIMENT

Figure 1:
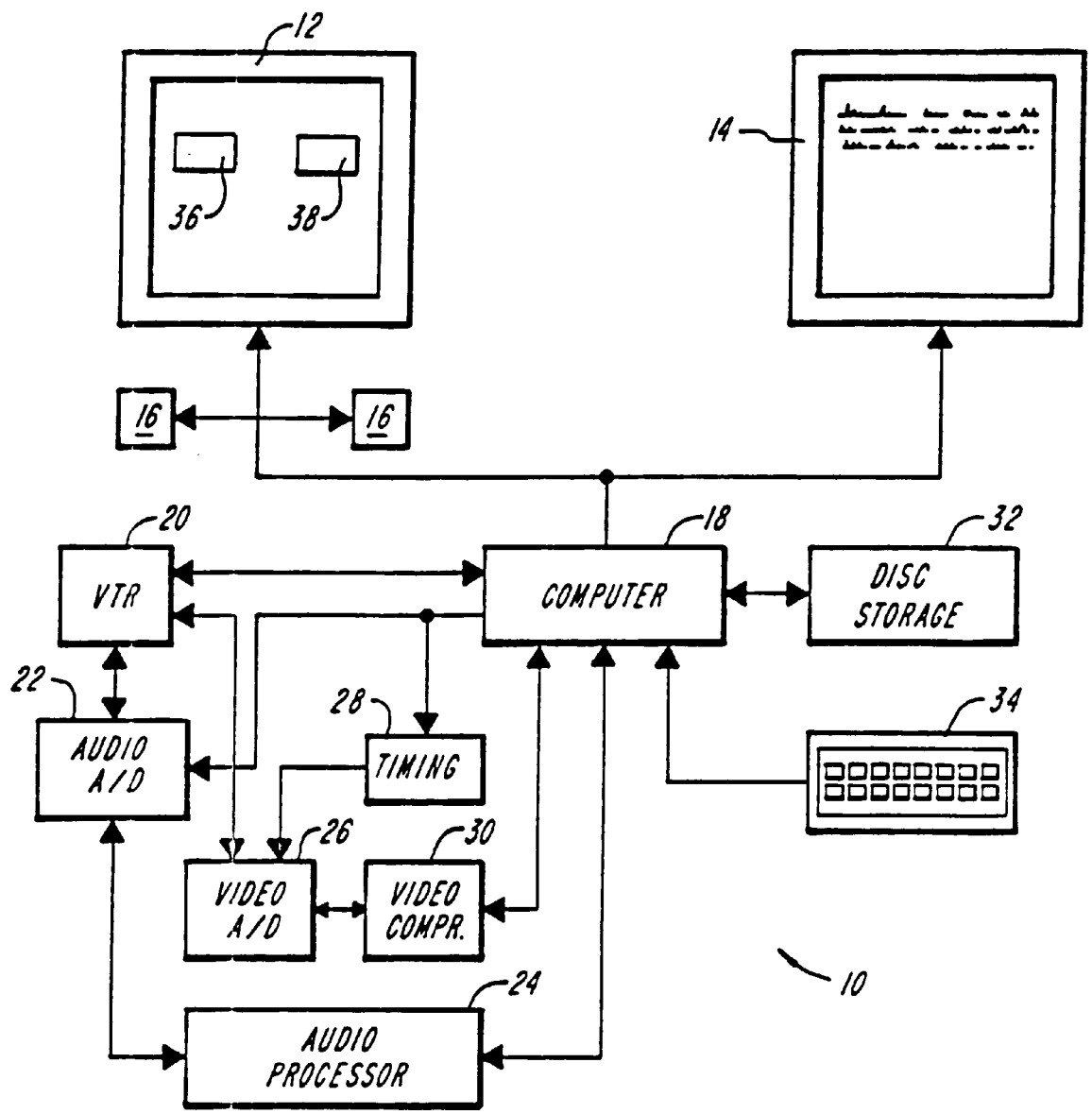
FIG. 1 is a schematic diagram of the electronic editing system of the invention.

Referring to FIG. 1, there is shown the electronic editing system of the invention 10, including two CRT displays 12, 14 for displaying digitized film during an editing session, and an audio output device 16, for example, a pair of speakers, for playing digitized audio during an editing session. The displays 12, 14 and audio output 16 are all controlled by a computer 18. Preferably, the computer is a Macintosh™ II$_{ci}$, II$_{fx}$, Quadra 900, or Quadra 950 all of which are available from Apple Computer, Inc., of Cupertino, Calif. The system includes a video tape recorder (VTR) 20 for accepting an electronic version of film footage, which is preprocessed and digitized by a video analog to digital converter (A/D) 26. A timing circuit 28 controls the speed of the video being digitized, as described below. A video compressor 30 is connected to the video A/D for compressing the electronic image data to be manipulated by the computer 18. An audio A/D 22 and audio processor 24 process audio information from the electronic version of film footage in parallel with the video processing. Disc storage 32 communicates with the computer to provide memory storage for digitized electronic image data. This disc storage may be optical, magnetic, or some other suitable media. The editing system is user-interfaced via a keyboard 34, or some other suitable user control interface.

In operation, video and audio source material from a film which has been transferred to a videotape is received by the system via the video tape recorder 20, and is preprocessed and digitized by the audio A/D 22, audio processor 24, video A/D 26, and video compressor 30, before being stored in the disc storage 32. The computer is programmed to display the digitized source video on a first of the CRTs 12 and play the accompanying digitized source audio on the audio output 16. Typically source material is displayed in one window 36 of the first CRT 12 and edited material is displayed in a second window 38 of that CRT. Control functions, edit update information, and commands input from the keyboard 32 are typically displayed on the second system CRT 14.

Once a film is input to the system, a film editor may electronically edit the film using the keyboard to make edit decision commands. As will be explained in detail below, the electronic editing system provides the film editor with great flexibility, in that the video displayed on the system CRT 12 may be measured and controlled in either the domain of film footage or the domain of videotape time code. This flexibility provides many advantages over prior electronic editing systems. At the end of an editing session, the electronic editing system provides the film editor with an edited videotape and both tape and film edit command lists for effecting the edits from the session on film or videotape.

As explained above, the electronic editing system 10 requires a videotape version of a film for electronic manipulation of that film. Such a tape is preferably generated by a standard film-tape transfer process, the telecine process, which preferably uses the Time Logic Controller™ telecine (TLC), a device that converts film into a video signal, then records the signal on videotape. A TLC controls the film-tape transfer more precisely than non-TLC systems. In addition, it outputs a report, described below, that includes video format specifications, i.e., timecode, edge number, audio timecode, scene, and take for each reference frame in each tape, thereby eliminating the need to search through the video or film footage manually to find the data required for creating a log of video playing particulars. Other telecine systems may be used, however, depending on particular applications.

Transfer from film to tape is complicated by the fact that film and video play at different rates—film plays at 24 frames per second (fps), whereas PAL video plays at 25 fps and NTSC (National Television Standards Committee) video plays at 29.97 fps. If the film is shot at the standard rate of 24 fps and then transferred to 29.97 fps NTSC video, the difference between the film and video play rates is large (and typically unacceptable). As a result, the film speed must be adjusted to accommodate the fractional tape speed, and some film frames must be duplicated during the transfer so that both versions have the same duration. However, if the film is shot at 29.97 fps, then transferring the footage to NTSC video is simple. Each film frame is then transferred directly to a video frame, as there are the same number of film and video frames per second.

Considering the most common case, in which 24 fps film is to be transferred to 29.97 fps NTSC videotape, the telecine process must provide both a scheme for slowing the film and a frame duplication scheme. The film is slowed down by the telecine apparatus by 0.1% of the normal film speed, to 23.976 fps, so that when the transfer is made, the tape runs at 29.97 fps, rather than 30 fps. To illustrate the frame duplication scheme, in the simplest case, and disregarding the film slow-down requirement, one second of film would be transferred to one second of video. The one second of film would include 24 frames of film footage, but the corresponding one second of video would require 30 frames of footage. To accommodate this discrepancy, the telecine process duplicates one film frame out of every four as the film is transferred to tape, so that for each second of film footage, the corresponding second of tape includes six extra frames.

Each video frame generated by the telecine process is actually a composite of two video fields: an odd field, which is a scan of the odd lines on a video screen, and an even field, which is a scan of the even lines. A video field consists of 262 ½ scan lines, or passes of an electron beam across a video screen. To create a full video frame comprised of 525 scan lines, an odd field, or scan of the odd lines, is followed by an even field, or scan of the even lines. Thus, when a duplicate video frame is generated and added in the telecine process, duplicate video fields are actually created. During play of the resulting tape, each two video fields are interlaced to make a single frame by scanning of the odd lines (field one) followed by scanning of the even lines (field two) to create a complete frame of NTSC video.

Figure 2:
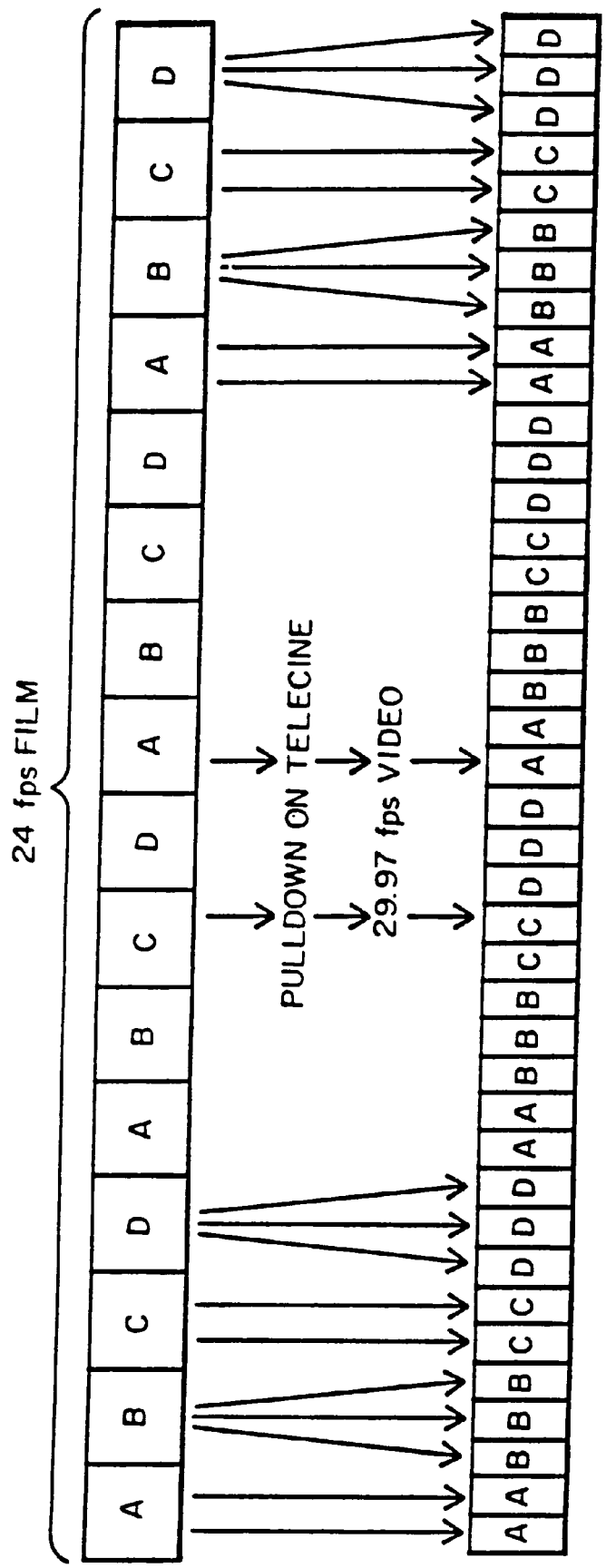
FIG. 2 is a diagram of the telecine film-tape transfer pulldown scheme.

There are two possible systems for creating duplicate video fields in the telecine process, those systems being known as 2–3 pulldown and 3-2 pulldown. The result of the 2–3 pulldown process is schematically illustrated in FIG. 2. In a film-tape transfer using 2–3 pulldown, the first film frame (A in FIG. 2) is transferred to 2 video fields AA of the first video frame; the next film frame B is transferred to 3 video fields BBB, or one and one half video frames, film frame C is transferred to two video fields CC, and so on. This 2–3 pulldown sequence is also referred to as a SMPTE-A transfer. In a 3-2 pulldown transfer process, this sequence of duplication is reversed; the first film frame A would be mapped to 3 video fields, the next film frame B would be mapped to 2 video fields, and so on. This 3-2 pulldown sequence is also referred to as a SMPTE-B transfer. In either case, 4 frames of film are converted into 10 video fields, or 5 frames of video footage. When a 2–3 pulldown sequence is used, an A, B, C, D sequence in the original film footage creates an AA, BB, BC, CD, DD sequence of fields in the video footage, as shown in FIG. 2. The telecine process slows down the film before the frame transfer and duplication process, so that the generated video frames run at 29.97 fps.

Figure 3:
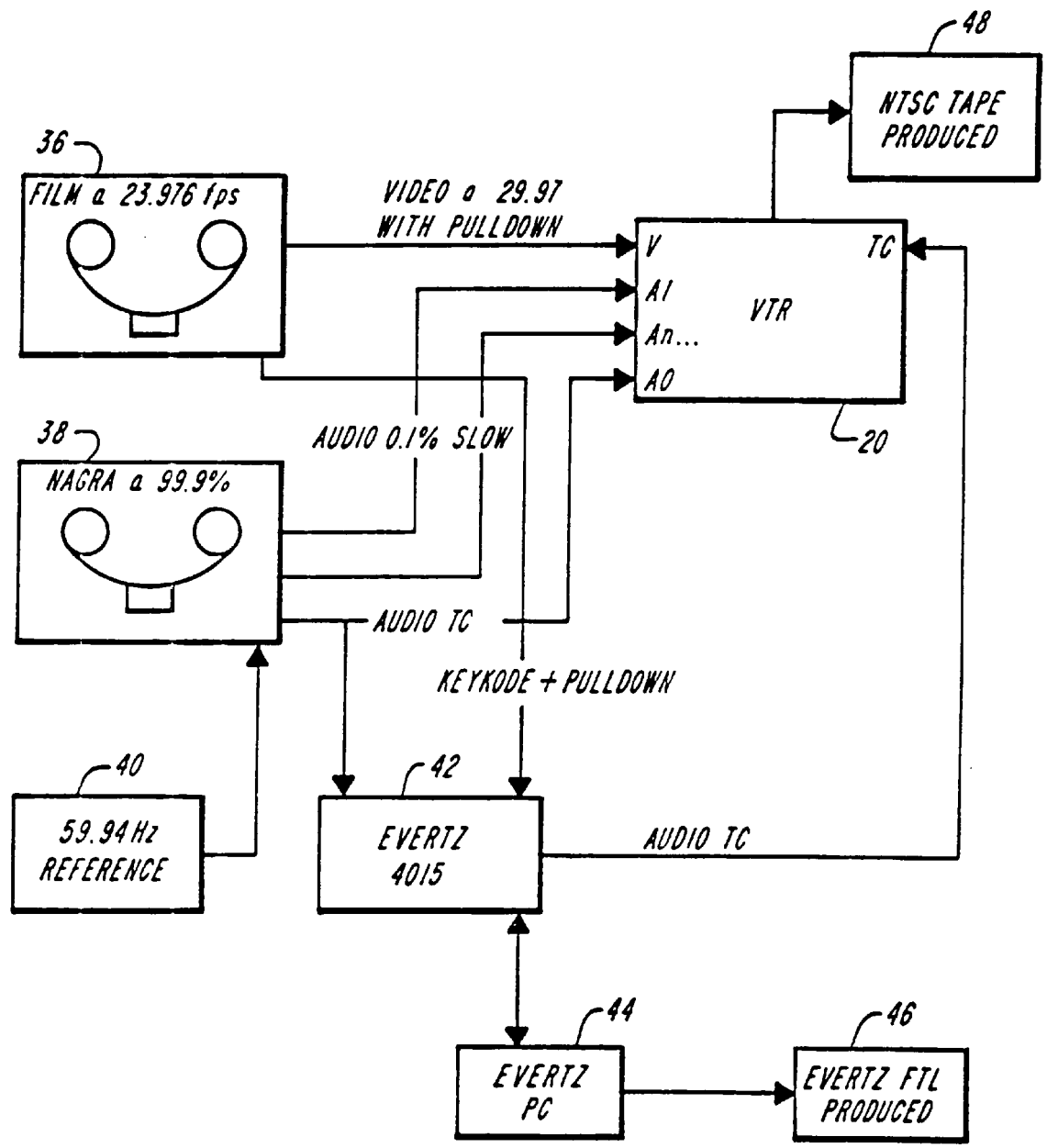
FIG. 3 is a schematic diagram of the telecine film-tape transfer system.

Referring to FIG. 3, as discussed above, the telecine 36 produces a video signal from the film; the video is generated to run at 29.97 fps and includes redundant film frames from the pulldown scheme. NAGRA™ audio timecode is the typical and preferable system used with films for tracking the film to its corresponding audiotape. During the telecine process, a corresponding audio track 38 is generated based on the NAGRA™ and is slowed down by 0.1% so that it is synchronized to the slowed film speed. The sound from the film audiotrack is provided at 60 Hz; a timing reference 40 at 59.94 Hz slows the audio down as required. Thus, the telecine process provides, for recordation on a videotape 48 via a videotape recorder 20, a video signal (V in the figure), corresponding audio tracks, $A_1-A_n$, and the audio timecode (audio TC).

A further film-tape correspondence is generated by the telecine process. This is required because, in addition to the difference between film and video play rates, the two media employ different systems for measuring and locating footage. Film is measured in feet and frames. Specific footage is located using edge numbers, also called edge code or latent edge numbers, which are burned into the film. For example, Kodak film provides Keykode™ on the film to track footage. The numbers appear once every 16 frames, or once every foot, on 35 mm film. The numbers appear once every 20 frames, or every half foot, on 16 mm film. Note that 35 mm film has 16 frames per foot, while 16 mm film has 40 frames per foot. Each edge number includes a code for the film manufacturer and the film type, the reel, and a footage counter. Frames between marked edge numbers are identified using edge code numbers and frame offsets. The frame offset represents the frame's distance from the preceding edge number.

Videotape footage is tracked and measured using a timebase system. Time code is applied to the videotape and is read by a time code reader. The time code itself is represented using an 8-digit format: XX:XX:XX:XX—hours:minutes:seconds:frames. For example, a frame occurring at 11 minutes, 27 seconds, and 19 frames into the tape would be represented as 00:11:27:19.

It is preferable that during the telecine conversion, a log, called a Film Transfer Log (FTL), is created that makes a correspondence between the film length-base and the video time-base. The FTL documents the relationship between one videotape and the raw film footage used to create that tape, using so-called sync points. A sync point is a distinctive frame located at the beginning of a section of film, say, a clip, or scene, which has been transferred to a tape. The following information documents a sync point: edge number of the sync point in the film footage, time code of the same frame in the video footage, the type of pulldown sequence used in the transfer, i.e., 2–3 pulldown or 3-2 pulldown, and the pulldown mode of the video frame, i.e., which of the A, B, C, and D frames in each film five-frame series corresponds to the sync point frame.

As shown in FIG. 3, an Evertz 4015 processor accepts the video signal from the telecine and the audio TC corresponding to the audiotrack and produces a timecode based on a synchronization of the audio and video. Then an Evertz PC 44 produces an Evertz FTL 46 which includes the sync point information defined above.

FIG. 4 illustrates a typical Evertz FTL 46. Each column of the log, specified with a unique Record #, corresponds to one clip, or scene on the video. Of particular importance in this log is the VideoTape Time Code In (VTTC IN) column 50 and VideoTape Time Code Out (VTTC OUT) column 52. For each scene, these columns note the video time code of the scene start and finish. In a corresponding manner, the Keyin column 54 and Keyout column 56 note the same points in film footage and frames. The Pullin column 58 and Pullout column 60 specify which of the A, B, C, or D frames in the pulldown sequence correspond to the frame at the start of the scene and the close of the scene. Thus, the FTL gives scene sync information that corresponds to both the video domain and the film domain.

The electronic editing system of the invention accepts a videotape produced by the telecine process and an Evertz FTL, stored on, for example, a floppy disk. When the FTL data on the disk is entered into the system, the system creates a corresponding bin in memory, stored on the system disc, in analogy to a film bin, in which film clips are stored for editing. The electronic bin contains all fields necessary for film editing, all comments, and all descriptions. The particulars of the bin are displayed for the user on one of the system's CRTs. FIG. 5 illustrates the display of the bin. It corresponds directly to the Evertz FTL. The "Start" and "End" columns of the bin correspond to the VideoTape Time Code In and VideoTape Time Code Out columns of the FTL. The "KN Start" and "KN End" columns of the bin correspond to the Keyin and Keyout columns of the FTL. During an editing session, the bin keeps track of the editing changes in both the video time-base and the film footage-base, as described below. Thus, the bin provides the film editor with the flexibility of keeping track of edits in either of the metrics.

Referring again to FIG. 1, when the electronic editing system 10 is provided with a videotape at the start of a film editing session, the videotape recorder 20 provides to the computer 18 the video and audio signals corresponding to the bin. The video signal is first processed by a video A/D coprocessor 26, such as the NuVista board made by TrueVision of Indianapolis, Ind. A suitable video coprocessor includes a video frame grabber which converts analog video information into digital information. The video coprocessor has a memory which is configured using a coprocessor such as the T134010 made by Texas Instruments, to provide an output data path to feed to the video compression circuitry, such as JPEG circuity, available as chip CL550B from C-Cube of Milpitas, Calif. Such a configuration can be performed using techniques known in the art. A timing circuit 28 controls the speed of the video signal as it is processed.

In operation, the video A/D 26 processes the video signal to reformat the signal so that the video represented by the signal corresponds to film speed, rather than videotape speed. The reformatted signal is then digitized, compressed, and stored in the computer for electronic film editing. This reformatting process allows users to provide the editing system with standard videotapes, in NTSC format, yet allows the video to be edited as if it were film, i.e., running at film speed, as is preferred by most film editors.

Figure 6:
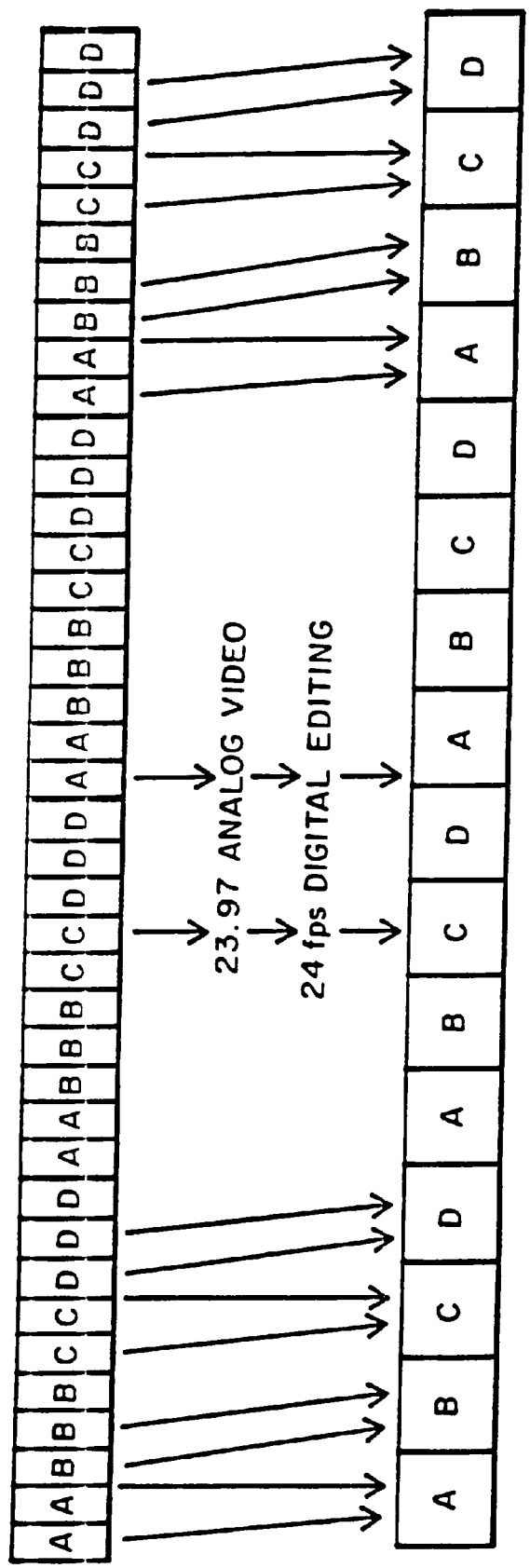
FIG. 6 is a diagram of the scheme employed by the editing system in digitizing a video input to the system.

Referring also to FIG. 6, in this reformatting process, the speed of the video from the videotape is increased from 29.97 fps to 30 fps, as commanded by the timing circuitry 28

(FIG. 1). Then the fields of the video are scanned by the system, and based on the pulldown sequence and pulldown mode specified for each scene by the bin, the redundant video fields added by the telecine process are noted, and then ignored, while the other, nonredundant, fields are digitized and compressed into digital frames. More specifically, a so-called "capture mask" is created for the sequence of video fields; those fields which are redundant are assigned a capture value of "0" while all other fields are assigned a capture value of "1". The system coprocessor reads the entire capture mask and only captures those analog video fields corresponding to a "1" capture value, ignoring all other fields. In this way, the original film frame sequence is reconstructed from the video frame sequence. Once all the nonredundant fields are captured, the fields are batch digitized and compressed to produce digitized frames.

Assuming the use of the 2–3 pulldown scheme, as discussed above, in the capture process, the first two analog video fields (AA in FIG. 6) would each be assigned a capture value of "1", and thus would be designated as the first digital frame; the next two analog video fields BB would also each be assigned a capture value of "1", and be designated as the second digital frame; but the fifth analog video field B, which is redundant, would be assigned a capture value of "0", and would be ignored, and so on. Thus, this process removes the redundant 6 frames added by the telecine process for each film second from the video, thereby producing a digitized representation which corresponds directly to the 24 fps film from which the video was made. This process is possible for either the 2–3 or 3-2 pulldown scheme because the bin specifies the information necessary to distinguish between the two schemes, and the starting frame (i.e., A, B, C, or D) of either sequence is given for each scene.

Appendix A of this application consists of an example of assembly language code for the MacIntosh™ computer and the TI 34010 coprocessor for performing the reformatting process. This code is copyrighted, and all copyrights are reserved.

Referring again to FIG. 1, an audio A/D 22 accepts audio from a videotape input to the editing system, and like the video A/D 26, increases the audio speed back to 100%, based on the command of the timing circuitry 28. The audio is digitized and then processed by the audio processor 24, to provide digitized audio corresponding to the reformatted and digitized video. At the completion of this digitization process, the editing system has a complete digital representation of the source film in film format, i.e., 24 fps, and has created a bin with both film footage and video timecode information corresponding to the digital representation, so that electronic editing in either time-base or footage-base may begin.

There are traditionally three different types of film productions that shoot on film, each type having different requirements of the electronic editing system. The first film production type, commercials, typically involves shooting on 35 mm film, transferring the film to a videotape version using the telecine process, editing the video based on the NTSC standard, and never editing the actual film footage, which is not again needed after the film is transferred to video. Thus, the electronic editing is here preferably based on video timecode specifications, not film footage specifications, and an NTSC video is preferably produced at the end of the edit process. The electronic commercial edit should also preferably provide an edit decision list (EDL) that refers back to the video; the edited version of this video is typically what is actually played as the final commercial.

The second production type, episodic film, involves shooting on either 35 or 16 mm film, and producing an NTSC videotape version and additionally, an (optional) edited film version for distribution in markets such as HDTV (High Definition Television) or foreign countries. To produce the edited film footage for the film version, the film is transferred to videotape using the telecine process, and electronic editing of the film is here preferably accomplished based on film footage, and should produce a cutlist, based on film footage specifications, from which the original film is cut and transferred to the NTSC format. To produce a video version, the videotape is then preferably edited based on video timecode specifications to produce an EDL for creating an edited video version.

The third film production type, feature film, typically involves shooting on 35 mm film, and produces a final film product; thus electronic editing is here preferably based on film footage specifications to produce a cutlist for creating a final film version.

Figure 7:
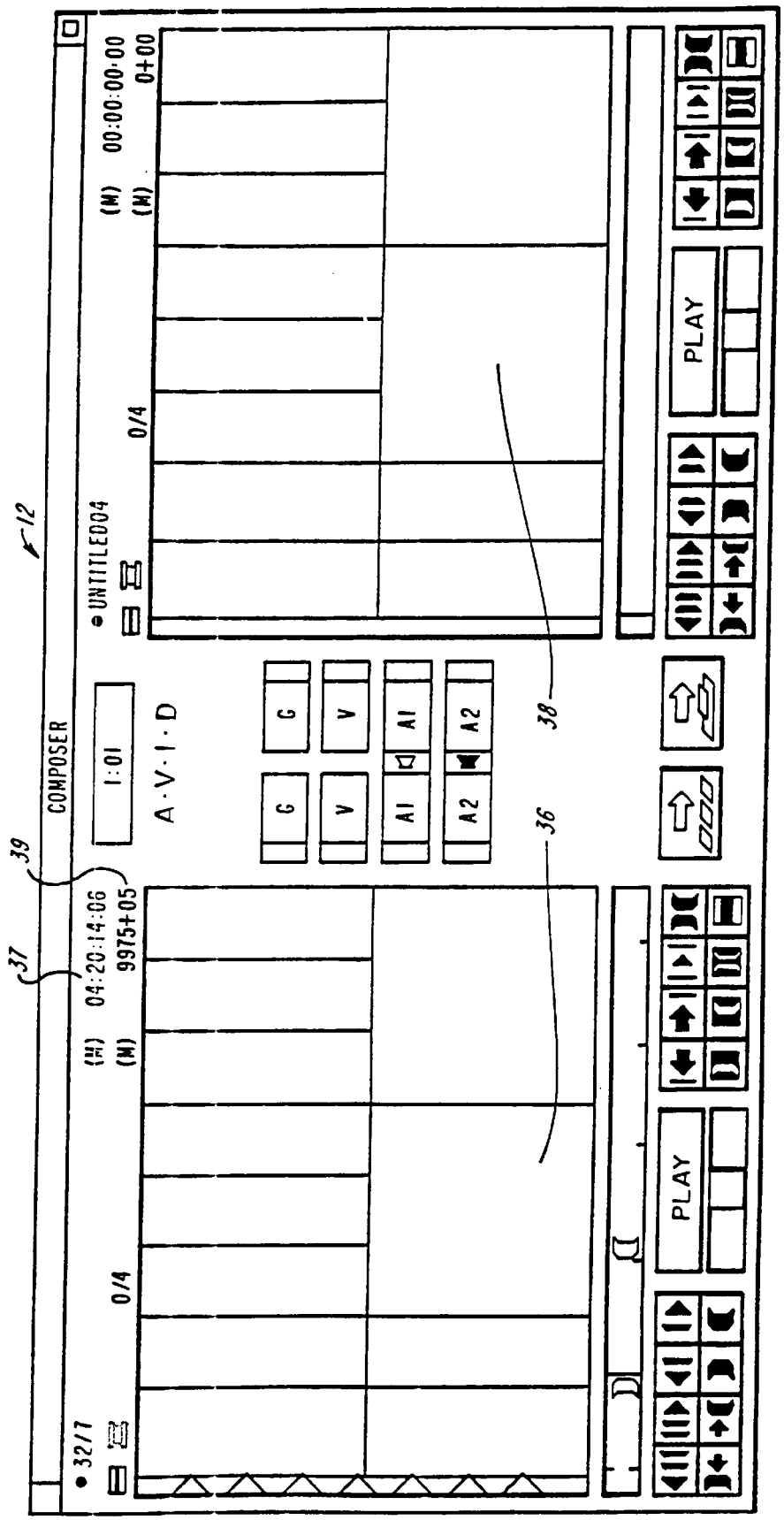
FIG. 7 is an illustration of a video screen showing the digitized video to be edited on the electronic editing system of the invention.

The user interface of the electronic editing system is designed to accommodate film editors concerned with any of the three film production types given above. As shown in FIG. 7, the video display CRT 12 of the system, which includes the source video window 36 and edited video window 38, displays metrics 37, 39 for tracking the position of digital frames in a scene sequence currently being played in the source window or the edit window. These metrics may be in either film footage format or video time code format, whichever is preferred by the user. Thus, those film editors who prefer film footage notation may edit in that domain, while those film editors who prefer video timecode notation may edit in that domain. In either case, the digitized frames correspond exactly with the 24 fps speed of the original source film, rather than the 29.97 fps speed of videotape, so that the electronic edits produced by the electronic editing correspond exactly with the film edits, as if the film were being edited on an old-style flat bed editor.

As an example of an editing session, one scene could be selected from the bin and played on the source window 36 of the system CRT display 12. A film editor could designate frame points to be moved or cut in either timecode or film footage format. Correspondingly, audio points could be designated to be moved or the audio level increased (or decreased). When it is desired to preview a video version of such edits, an NTSC video is created by the system based on the sync information in the electronic bin, from the system disc storage, to produce either a so-called rough cut video, or a final video version. In this process, the system generates an analog version of the digital video signal and restores the redundant video frames necessary for producing the NTSC video rate. The system also produces a corresponding analog audio track and decreases the audio speed so that the audio is synchronized with the video. In this way, the system essentially mimics the telecine process by slowing down the video and audio and producing a 29.97 fps videotape based on a 24 fps source.

Referring again to FIG. 1, in creating an NTSC video from a digitized film version, the video compressor 30 retrieves the digitized video frames from the computer 18 and based on the electronic bin information, designates video fields. The video A/D 26 then creates an analog version of the video frames and processes the frames using a pulldown scheme like that illustrated in FIG. 2 to introduce redundant video frames. The video speed is then controlled by the timing circuit 28 to produce 29.97 fps video as required for an NTSC videotape. Correspondingly, the system audio process 24 and audio A/D 22 processes the digital audio signal based on the electronic bin to generate an analog version of the signal, and then slows the signal by 0.1% to synchronize the audio with the NTSC video. The final video and audio signals are sent to the videotape recorder 20, which records the signals on a videotape.

The electronic editing system may be programmed to produce an edit listing appropriate to the particular media on which the finalized version of the film source material is to appear. If the source film material is to be finalized as film, the system may be specified to produce a cut list. The cut list is a guide for conforming the film negative to the edited video copy of the film footage. It includes a pull list and an assemble list. The assemble list provides a list of cuts in the order in which they must be spliced together on the film. The pull list provides a reel-by-reel listing of each film cut. Each of these lists specifies the sync points for the cuts based on film footage and frame keycode, as if the film had been edited on a flatbed editor. If the source film material is to be finalized as video, the system may be specified to produce an edit decision list (EDL). The EDL specifies sync points in video time code, as opposed to film footage. The editing system generates the requested edit lists based on the electronic bin; as the film is electronically edited, the bin reflects those edits and thus is a revised listing of sync points corresponding to the edited film version. Because the bin is programmed to specify sync points in both film footage and video timecode, the editing system has direct access to either format, and can thereby generate the requested EDL or assemble and pull lists. Appendix B consists of examples of an EDL, assemble lists, and pull lists, all produced by the electronic editing system. Thus, at the end of an electronic film edit, the editing system provides a film editor with an NTSC videotape of the film edits and a edit list for either film or videotape.

Other embodiments of the invention are within the scope of the claims.

What is claimed is:

1. A computer-based system for converting film comprised of a plurality of frames into a sequence of digital images having a one-to-one correspondence with the plurality of frames in the film, the system comprising:
   a processor having a first input for receiving a sequence of images including a plurality of fields, wherein each frame in the film corresponds to at least two fields in the sequence of images and wherein at least one of the frames in the film corresponds to three or more fields in the sequence of images, so that the sequence of images includes redundant fields and nonredundant fields, and having a second input that receives data indicative of the redundant fields, wherein, the processor digitally captures the sequence of images, identifies the nonredundant fields of the sequence of images, and generates the sequence of digital images that have the one-to-one correspondence with the plurality of frames in the film; and
   a random access computer readable medium that stores the sequence of digital images a editing by an editing system.

2. The computer-based system of claim 1, wherein the processor includes means for generating the sequence of digital images starting with any field in the sequence of images using the data indicative of the redundant fields.

3. The computer-based system of claim 1, further comprising a telecine device that generates the sequence of images from the film.

4. The computer-based system of claim 3, wherein the telecine device also provides a film transfer log including the synchronization point between the film and the sequence of images and the data indicative wherein the pulldown sequence the pulldown sequence was used to generate the sequence of images from the film.

5. The computer-based system of claim 1, wherein the processor generates a sequence of capture mask values, each capture mask value being assigned to one of the redundant fields and the nonredundant fields, and wherein the processor includes a frame grabber which processes the sequence of images to identify the nonredundant fields according to the capture mask values.

6. The computer-based system of claim 5, wherein the processor further includes an analog-to-digital converter, responsive to the frame grabber, that digitizes the nonredundant fields to provide the sequence of digital images.

7. The computer-based system of claim 1, further comprising a compressor that compresses the sequence of digital images.

8. The computer-based system of claim 1, further comprising a display that displays the sequence of digital images at a same frame rate that the film was captured or that the film was intended to be played back.

9. The computer-based system of claim 1, further comprising a means for receiving digitized audio data having a rate corresponding to the sequence of digital images having the one-to-one correspondence with the plurality of frames in the film; and
   means for synchronizing the digitized audio data with the sequence of digital images having the one-to-one correspondence with the plurality of frames in the film.

10. The computer-based system of claim 1, wherein the sequence of images is a television signal.

11. The computer-based system of claim 1, wherein the sequence of images is a sequence of digital images.

12. A method for converting film comprised of a plurality of frames into a sequence of digital images having a one-to-one correspondence with the plurality frames in the film, the method comprising the steps of:
   identifying nonredundant fields of a sequence of images having a plurality of fields, wherein each frame in the film corresponds to at least two fields in the sequence of images and at least one of the frames in the film corresponds to three or more fields in the sequence of images so that the sequence of images includes redundant fields and nonredundant fields and data indicative of the redundant fields, based upon the data indicative of the redundant fields;
   generating, using the nonredundant fields, the sequence of digital images having the one-to-one correspondence with the plurality of frames in the film; and
   storing the sequence of digital images in a random accessible computer readable medium for editing by an editing system.

13. The method of claim 12, wherein the sequence of digital images is provided starting with any field of the sequence of images.

14. The method of claim 12, further comprising the step of generating the sequence of images from the film.

15. The method of claim 14, wherein the step of generating the sequence of images is done by performing a telecine operation on the film to generate the sequence of images including the redundant fields, the nonredundant fields and the data indicative of the redundant video fields.

16. The method of claim 15, wherein the step of generating the sequence of images also includes generating a film transfer log including a synchronization point between the film and the sequence of images, and data indicative where in a pulldown sequence the pulldown sequence was used to generate the sequence of images.

17. The method of claim 12, further comprising the step of displaying the sequence of digital images at a same frame rate that the film was captured or intended to be played back.

18. The method of claim 12, further comprising the steps of receiving digitized audio data having a rate corresponding to the sequence of digital images having the one-to-one correspondence with the plurality of frames in the film; and synchronizing the digitized audio data with the sequence of digital images having the one-to-one correspondence with the plurality of frames in the film.

19. The method of claim 12, further including the step of assigning a capture mask value to each field of the nonredundant fields and the redundant fields, and wherein the step of identifying the nonredundant fields is based on the capture mask values.

20. The method of claim 19, wherein the step of assigning the capture mask value to each field in the plurality of fields includes assigning a capture mask value of "0" to each redundant field and a capture mask value of "1" to all other fields.

21. The method of claim 19, wherein the step of identifying the nonredundant fields comprises processing the capture mask values for each field.

22. The method of claim 12, further comprising the step of compressing the sequence of digital images.

23. The method of claim 14, wherein the sequence of images is generated so that it can be displayed at a frame rate of 29.97 frames per second.

* * * * *

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Title Page:
Under References Cited, U.S. PATENT DOCUMENTS, insert:

| | | |
|---|---|---|
| 4,567,532 | Baer et al. | 01/1996 |
| 4,709,277 | Ninomiva et al. | 11/1987 |
| 4,786,979 | Claus et al. | 11/1988 |
| 4,901,161 | Giovanella | 02/1990 |
| 5,124,807 | Dunlap et al. | 06/1992 |
| 5,140,414 | Mowry | 08/1992 |
| 5,191,427 | Richards et al. | 03/1993 |
| 5,218,672 | Morgan et al. | 06/1993 |
| 5,283,819 | Glick et al. | 02/1994 |
| 5,374,954 | Mowry | 12/1994 |
| 5,406,326 | Mowry | 04/1995 |
| 5,412,773 | Carlucci et al. | 05/1995 |
| 5,457,491 | Mowry | 10/1995 |
| 5,565,998 | Coombs et al. | 10/1996 |

Under References Cited, Foreign Patent Documents, insert:

| | | |
|---|---|---|
| 0473322 | 3/1992 | European Patent, Qffice |
| WO 91/06182 | 5/1991 | WIPO |
| 39 25046 | 1/1991 | Germany |

Under References Cited, Other Publications, insert:
Conversation with Larry Seehorn, "The Midas Touch," Videography Journal, May 1989, pp. 78-81.

Seehorn Technologies, Inc., "Midas II," nine-page brochure, Oct. 1988.

"Editdroid--The Editing System of Choice," six page brochure, 1985.

Peters, Eric C, "Real Time Object Oriented, Non-Linear Editing System for Film and Video," Presented at 131st SMPTE Technical Conference, Los Angeles, California, Oct. 21-25, 1989.

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Title Page (continued):
Avid Technology, Media Match: A Guide to Film-Tape Transfer, 1991.

Ohanian, Thomas A., "Digital Nonlinear Editing," Boston: Focal Press 1993, i-vii, pp. 87-94 and 317-330.

Paik, W., "Digicipher tm-all digital, channel compatible, HDTV broadcast system", IEEE Transactions on Broadcasting, Vol. 36, No. 4, December 1990, (New York, US), pp. 245-254.

Krieg, P., "Multimedia-Computer und die Zukunft des Film/Nideoschnitts", FKT Fernseh - und KinoTechnik, Vol. 45, No. 5, 1991, (Heidelberg, DE), pp. 252-258. (No translation.)

Charles A. Pantuso, "Reducing Financial Aliasing in HDTV Production", Better Video Images, 23rd Annual SMPTE Television Conference in San Francisco, CA Feb. 3-4, 1989" insert --, pp. 157-169- .

Column 6:
Line 49, replace "T134010" with --TI34010--.

Column 9:
Line 36, after "claims." please insert Appendix A and Appendix B as attached.
Line 50, after "wherein" delete ",".
Line 57, replace "a" with --for--.
Line 67, replace "the" with --a--.

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Column 10:
Line 2, delete "the" (first occurrence).
Line 2, replace "wherein the " with --of a--.
Line 3, after "sequence" (first occurrence) insert --wherein--.
Line 37, after "plurality" insert --of--.
Line 67 through column 11, line 1 delete "where in" and insert --of--.

Column 11:
Line 1, after sequence" (first occurrence), insert --wherein--.

Signed and Sealed this

Tenth Day of July, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips Page 4 of 18

It is certified that error appears in the above-identified patent and that said Letters Patent is hereby corrected as shown below:

APPENDIX A

```
/*
 * /----------------------------------------------------------------\
 * | The following programs are the sole property of Avid Technology, Inc., |
 * | and contain its proprietary and confidential information.      |
 * |                 Copyright © 1989-1992 Avid Technology, Inc.    |
 * \----------------------------------------------------------------/
 *
 * Module Name:    mfm_allocate.c
 *
 * Module Description:
 *
 */
#include     "mfm_allocate.h"

#include     "AvidGlobals.h"
#include     "expansionDefs.h"
#include     "LinkList.h"
#include     "mfm.h"
#include     "disk_mac.h"
#include     "memrtns.h"
#include     "Digitize.h"
#include     "LogicalToPhysical.h"
#include     "channel.h"
#include     "ResourceBible.h"
#include     "env.h"
#include     "uid.h"
#include     "MacUtils.h"
#include     "DebugUtils.h"
#include     "VolumeMenu.h"
#include     "JPEGUtils.h"
#include     "Exception.h"
#include     "dialogUtils.h"
#include     "FSutils.h"
#include     "BaseErrorDefs.h"
#include     "autorequest.h"
#include     "ResourceDefs.h"
#include     "videoDefs.h"

define BREATHING_ROOM  200    /* KB to leave for directory expansion */ define DIG_MODE   1
define LOG_MODE   2 typedef struct
{
    MFM_CRUX     crux;
    short        vRef;
    channel_t    channel;
    long         bytesPerSec;
    long         blocksToAlloc;
    long         blockSize;
} mfm_alloc_t,
  * mfm_alloc_ptr,
  **mfm_alloc_hdl;

/***** Static Variables *****/
static  listID    alloc = NIL;
static  u_long    ApproxFrameSize = 1L;
static  char      theCapMode    = DIG_MODE;       // DIG_MODE, LOG_MODE
static  Ftype_t   theFtype      = 0;
static  float     theCapRate    = 0;
static  MFM_CRUX  theVcrux      = 0;              // When these are zero the cruxes are clo
static  MFM_CRUX  theA1crux     = 0;
static  MFM_CRUX  theA2crux     = 0;
static  short     theVvref      = BAD_VREFNUM,
                  theAvref      = BAD_VREFNUM;
static  long      theSampsPerSec = 0,
                  theBytesPerSamp = 0;
static  long      theTimeAvail  = 0;              // the minimum of the times available in
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips Page 5 of 18

It is certified that error appears in the above-identified patent and that said Letters Patent is hereby corrected as shown below:

```
static  videoFormat_t    theVideoFormat   = PAL_f;              // more likely to catch bugs by initing t
static  sourceFormat_t   theSourceFormat  = VIDEO_f;
static  videoType_t      theVideoType     = {8, VMHiResHiColor};  // HACK for now
static  capture_mask_t   theCaptureMask   = 0L;
static  capture_mask_t   theResultMask    = 0L;
static  u_char           theCapShift      = 0;
static  u_char           theResultShift   = 0;

static  channel_t        theChannels      = 0;
static  audioClock_t     theAudioClock    = Clock44100;
static  audioRate_t      theAudioRate     = halfRate;
static  Boolean          theAudioMixed    = FALSE;
static  Boolean          useEmptiestVideo = TRUE,
                         useEmptiestAudio = TRUE;

/***** Defined Below *****/
static  void             setVinfo( Ftype_t Ftype, capture_mask_t captureMask, u_char captureShift, float captu
static  void             amMItem2Val( short mitem, audioClock_t *audioClock, audioRate_t *audioRate, long *aud
static  MFM_CRUX         mfaAllocCreate(long bytesPerSec, short vref, channel_t channel, Boolean preflight);
static  void             mfaAllocCalc(Boolean preflight);
static  void             mfaAllocEnd(void);
static  void             mfaAllocPunt(void);
static  long             TotalBytes(short theVref);
static  void             checkVolumeSettings(void);
static  videoModifier_t  getVideoModifier(short iQuality, short cQuality);

/**************************************************/
/****      Public Code                         ****/
/**************************************************/

/*******************************************************************************
 *
 * mfaSetSettings
 */
Boolean mfaSetSettings( channel_t chans, float capRate, u_char phase,
                        audioClock_t audioClock, audioRate_t audioRate, Boolean audioMixed,
                        short Vvref, short Avref, videoType_t video_type)
{
    Boolean    needsReinit;

mfaForgetFiles (OUT_ALL);
    needsReinit = FALSE;

if(!CksumValid(ck_44khz) && audioRate == fullRate)
        audioRate = halfRate;
    if(!CksumValid(ck_48khz))
        audioClock = Clock44100;

if (theCapMode == DIG_MODE && (theChannels != chans ||
                                   theCapRate != capRate ||
                                   theAudioClock != audioClock ||
                                   theAudioRate != audioRate ||
                                   theAudioMixed != audioMixed))
        needsReinit = TRUE;

/*
     *  Set the mfm_allocate statics
     */ theChannels     = chans;
    theCapRate      = capRate;
    theAudioClock   = audioClock;
    theAudioRate    = audioRate;
    theAudioMixed   = audioMixed;
    theVvref        = Vvref;
    theAvref        = Avref;

useEmptiestVideo = (theVvref == BAD_VREFNUM);
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
useEmptiestAudio = (theAvref == BAD_VREFNUM);

xprotect
    {
    checkVolumeSettings ();
    }
xexception
    {
    if (!xcodeEquals (MFA_NO_MEDIA_DRIVES))
        xpropagate();

auto_request("You will not be able digitize until a valid\nmedia volume is placed online.", "OK", 1);
    }
xend;

/*
 * Setup video capture mode info
 */
switch( (int)(theCapRate*10))
    {
    case 240:
        if( phase == 0)
            setVinfo (FULL, 0xD8000000L, 0, 24.0, 0x80000000L, 0);      // 1101 1xxx      ,4 ou
        else if( phase == 1)
            setVinfo (FULL, 0xB8000000L, 0, 24.0, 0x80000000L, 0);      // 1011 1xxx      ,4 ou
        else if( phase == 3)
            setVinfo (FULL, 0x78000000L, 1, 24.0, 0x80000000L, 0);      // 0111 1xxx      ,4 ou
        else
            setVinfo (FULL, 0xE8000000L, 0, 24.0, 0x80000000L, 0);      // 1110 1xxx      ,4 ou
        break;
    case 120:
        if( phase == 0 || phase == 1)
            setVinfo (FULL, 0x48000000L, 2, 12.0, 0x40000000L, 1);      // 0100 1xxx      ,2 ou
        else
            setVinfo (FULL, 0x28000000L, 2, 12.0, 0x40000000L, 1);      // 0010 1xxx      ,2 ou
        break;
    case  60: setVinfo (FULL, 0x08000000L, 4,  6.0, 0x10000000L, 3); break;   // 0000 1xxx    ,1 ou
    case 300: setVinfo (FULL, 0x80000000L, 0, 30.0, 0x80000000L, 0); break;   // 1xxx xxxx    ,1 ou
    case 150: setVinfo (FULL, 0x40000000L, 1, 15.0, 0x40000000L, 1); break;   // 01xx xxxx    ,1 ou
    case 100: setVinfo (FULL, 0x20000000L, 2, 10.0, 0x20000000L, 2); break;   // 001x xxxx    ,1 ou
    case 250: setVinfo (FULL, 0x80000000L, 0, 25.0, 0x80000000L, 0); break;   // 1xxx xxxx    ,1 ou
    case 125: setVinfo (FULL, 0x40000000L, 1, 12.5, 0x40000000L, 1); break;   // 01xx xxxx    ,1 ou
    case  50: setVinfo (FULL, 0x08000000L, 4,  5.0, 0x08000000L, 4); break;   // 0000 1xxx    ,1 ou
    }
                                                                          // Get it from global no
theSourceFormat = sourceFormat;                                           // Get it from global no
theVideoFormat  = videoFormat;                                            // Get it from global no
theVideoType.vcID = gVideoType.vcID;
theVideoType.videoModifier = video_type.videoModifier;

SetDigitizeCaptureMask (theCaptureMask, theCapShift);

/*
 * Setup audio capture mode info
 */
theSampsPerSec   = ((audioRate == fullRate) ? (audioClockToClockRate(audioClock)) : (audioClockToClock
theBytesPerSamp  = (audioRate == fullRate ? 2 : 1);

return needsReinit;
}
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
* Addresses of hardware registers:
divect      .set   0fffffea0h   ;the Display-Interrupt vector location
dpytrap     .set   0fffffea0h   ;address of DPYINT trap vector
mode        .set   0f8600000h   ;video mode register
status      .set   0f8290000h   ;video status register vsblnk      .set   0c0000060h   ;gsp control registers:
vtotal      .set   0c0000070h   ;total vertical lines
dpyctl      .set   0c0000080h   ;
dpystrt     .set   0c0000090h   ;
dpyint      .set   0c00000a0h   ;
control     .set   0c00000b0h   ;
hstctll     .set   0c00000c0h   ;
intenb      .set   0c0000110h   ;
intpend     .set   0c000012ch   ;
convsp      .set   0c0000130h   ;
convdp      .set   0c0000140h   ;
psize       .set   0c0000150h   ;
pmask       .set   0c0000160h   ;
pmaskext    .set   0c0000170h   ;

* Constants and masks:
msginmsk    .set   0007h        ;Fields in hstctll register
msgoutmsk   .set   0070h
msginisave  .set   0002h
msgindbg    .set   0007h
msgintmsk   .set   0008h        ;intin field in hstctll
msginf2     .set   0003h
msgoutisave .set   0020h
msgoutdbg   .set   0070h
msgoutf2    .set   0030h
msgoutinc   .set   0010h
intin       .set   0008h
intout      .set   0080h
ctlmsk      .set   801fh        ;Mask for the CONTROL register.
di          .set   10           ;Bit number of Display Interrupt bit
dispint     .set   1<<di        ;"Display Interrupt" bit of intenb and intpend
ni          .set   14           ;Bit number of Non Interlaced bit
notinterl   .set   1<<ni        ;The non-interlaced bit
ce_bit      .set   8000h        ;"Capture Enable" bit of video mode register
di          .set   10           ;Bit number of Display Interrupt bit
special     .set   2000000h     ;Offset for special JPEG hardware fifo "memory space"
palLines    .set   576          ;Number of lines in a frame
ntscLines   .set   480          ;Number of lines in a frame
rowbase     .set   0f8000000h   ;row table main picture starting address
traps       .set   0fffffc00h   ;address of trap page
macrows     .set   480          ;mac row table entries
vrows       .set   palLines+8   ;video rows in row table (incl color table & PAL)
crows       .set   palLines/2   ; Maximum # lines in a field (pal is larger)
maxfield    .set   palLines/2   ; maximum # of lines in a field
pmemrow     .set   8000h        ;length in bits of physical memory rows
NVBLBIT     .set   4            ;Not Vertical Blanked -- bit position in video status reg
dpitch      .set   4000h        ;pitch of MAC (16-bit pixel) lines (2 kB)
dpShift     .set   14           ;Shifting a number by this multiplies by dpitch
pixsize     .set   16           ;Pixel size constant for "psize" register
pstride     .set   64           ;Number of bits between pixel "hits" in output image cmdNone     .set   0            ;undefined command code
cmdPlay     .set   1            ;normal multi-frame playback to alternate screen buffer
cmdPack     .set   2            ;(UNUSED in FullRes)Pack 256*192 image
cmdUnpack   .set   3            ;unpack still frame to vcopy double buffer area (decompress)
cmdShow     .set   4            ;unpack and show a still frame in main screen buffer
cmdFull     .set   5            ;full-screen playback on an NTSC monitor
cmdBigPack  .set   6            ; pack a 640x480 image
cmdBigUnpack .set  7            ; unpack an image to 640*480
cmdUnpackAdd .set  8            ; unpack and combine an image
cmdUnpack16 .set   9            ; unpack a 16 bit frame in 32 bit mode
cmdPack16   .set   10           ; pack a 16 bit frame in 32 bit mode
```

UNITED STATES PATENT AND TRADEMARK OFFICE
CERTIFICATE OF CORRECTION

PATENT NO.   : 5,905,841

DATED        : May 18, 1999

INVENTOR(S)  : Eric C. Peters; Patrick D. O'Connor; Michael E. Phillips

It is certified that error appears in the above-identified patent and that said Letters Patent is hereby corrected as shown below:

```
vramBase    .usect  "vectors",32
frameBuf    .usect  "vectors",32
bigBuf      .usect  "vectors",32
```

```
* Routine to sync to an odd field:
syncodd:
s1  move    *Rstatp,Rtemp
    btst    0,Rtemp
    jmz     s1
    move    *Rstatp,Rtemp
    btst    0,Rtemp
    jmz     s1
s2  move    *Rstatp,Rtemp
    btst    0,Rtemp
    jrz     s2
    move    *Rstatp,Rtemp
    btst    0,Rtemp
    jrz     s2
    rets

* Routine to sync to an even field:
synceven:
s3  move    *Rstatp,Rtemp
    btst    0,Rtemp
    jrz     s3
    move    *Rstatp,Rtemp
    btst    0,Rtemp
    jrz     s3
s4  move    *Rstatp,Rtemp
    btst    0,Rtemp
    jmz     s4
    move    *Rstatp,Rtemp
    btst    0,Rtemp
    jmz     s4
    rets
```

```
MEMORY
    MAPPE2: origin = 0ffd0000h,  length = 20000h
    NOMAP:  origin = 0fff00000h, length = 0c8000h
    JSTAT:  origin = 0fb80000h,  length = 16
    VEC:    origin = 0ffffd000h, length = 00100h SECTIONS
    vectors:    {} > VEC
    args:       {} > NOMAP
    .data:      {} > NOMAP
    .text:      {} > MAPPE2
    ;status:    {} > JSTAT
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
        .title  "VISTA image capture and compress"

* /-----------------------------------------------------------------\
 * | The following programs are the sole property of Avid Technology, Inc., |
 * | and contain its proprietary and confidential information.       |
 * |             Copyright © 1989-1991 Avid Technology, Inc.         |
 * \-----------------------------------------------------------------/

* General register names:
Rtemp    .set   A0   ;Temp register
Rpixcnt  .set   A1   ;Constant Pixels per line
Rpixel   .set   A2   ;Pointer to current input pixel
Rpxinc1  .set   A3   ;Constant # of bits to increment Rpixel to next input pixel
Rpxinc2  .set   A4   ;Alternate Constant to increment Rpixel to next input pixel
Rline    .set   A5   ;Constant Pitch of an input line in bits (same value as Sptch)
Rpixtmp  .set   A6   ;Temp register for writing to pixel locations
Rjstatp  .set   A7   ;Constant pointer to JPEG fifo status
Rx       .set   A8   ;Counter of pixels in a line
Rnext    .set   A9   ;Pointer to next input line
Rstatp   .set   A10  ;Constant pointer to video status
Rblack   .set   A11  ;Pointer to a black pixel
Rtemp2   .set   A12
R13      .set   A13
R14      .set   A14

Saddr    .set   B0   ;Source pixel array starting address
Sptch    .set   B1   ;Source pitch (# of bits from one line to next)
Offset   .set   B4   ;Base address of source pixel array
Bxy      .set   B7   ;Pixel array dimensions(rows:columns)
Rlincnt  .set   B9   ;Constant: lines per frame
Ry       .set   B10  ;Counter: lines per frame
Rcapture .set   B11  ;Bit mask: frame skipper
Rloadcap .set   B12  ;Bit mask: used to reinit Rcapture
RB13     .set   B13
RB14     .set   B14 pixmsk   .set   8000h  ;Constant for "pmask" register (kill alpha chan)
spitch   .set   8000h  ;Constant for "Sptch" register (4 kBytes in bits)

.copy  "equates.i"

jstatus  .usect "jstatus",16          ;JPEG fifo status

* Args TO <- and FROM -> the NuVista processor:
initcm   .usect "args",32  ;<-initial capture mask
captmsk  .usect "args",32  ;<-reload capture mask
overrun  .usect "args",32  ;->number of overruns detected (inited by Mac)
frames   .usect "args",32  ;->number of frames seen (inited by Mac)
tdummy1  .usect "args",32  ;"fence" arg in other µcode <-
tdummy2  .usect "args",32  ;"fencerr" arg in other µcode ->
tx       .usect "args",32  ;<-number of x locs to hit
ty       .usect "args",32  ;<-number of y locs (lines) to hit
tstride1 .usect "args",32  ;<-stride in bits between input pixel locs
tstride2 .usect "args",32  ;<-alt stride in bits between input pixel locs
tdelay   .usect "args",32  ;<-amount of delay before capturing each line (default = 1)

.copy  "captureMacros.i"

.data
stack:   .bes   4000h     ;Stack space (2kB) for calls and interrupts

.page
         .text
         .align

Flag:
         .long  0                 ; Debug: Current value of pixel fifo status
Dat:
         .long  0,0,0,0,0,0,0,0   ; Reserved for debug info
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
* Start of main program

.def     _main
_main
       setf     16,0,0            ; Field zero is 16-bit unsigned
       setf     32,0,1            ; Field one is 32-bit unsigned movi     stack,sp          ; Load stack pointer movi     spitch,Sptch      ; Load contstant number of bits per line
       move     Sptch,Rline
       movi     pixmsk,Rtemp      ; Init pixel mask
       move     Rtemp,@pmask
       move     Rtemp,@pmaskext
       movi     jstatus+8,Rjstatp ; Load pointer to JPEG status register
       clr      Rpixtmp           ; Clear pixel temp
       movi     status,Rstatp     ; Load pointer to video status register

*  Clear DONE and wait for GO:
       clr      Rtemp
       movb     Rtemp,@hstctll    ;clear msgout (the DONE bit and interrupt bits) to host
hosths:
       movb     @hstctll,Rtemp    ;read host control register
       andi     msginmsk,Rtemp    ;mask message
       jrz      hosths            ;wait for GO signal (any non-zero value)
       movi     msgoutinc,Rtemp
       move     Rtemp,@hstctll    ;set indicator to let host know we have started

*  Get some host args into registers:
       move     @tx,Rpixcnt,1     ;number of stores in x
       move     @ty,Rlincnt,1     ;number of lines in frame
       move     @tstride1,Rpxinc1,1 ;number of bits between pixels
       move     @tstride2,Rpxinc2,1 ;alt number of bits between pixels

*  For debug, write parameters back to memory:
       movi     Dat,Rtemp         ;get addr of debug dump area
       move     Rpixcnt,*Rtemp+,1 ;x
       move     @ty,*Rtemp+,1     ;y
       move     Rpxinc1,*Rtemp+,1 ;stride 1
       move     Rpxinc2,*Rtemp+,1 ;stride 2
       move     Rline,*Rtemp+,1   ;source pitch in bits (number of bits from one line to the next)

*  N.B. The x argument (Rpixcnt) MUST be a multiple of 32!
       srl      5,Rpixcnt         ;divide line length (x) by 32 for unrolled loop callr    syncodd           ;FIRST TIME: Wait for start of odd field move     @mode,Rtemp
       ori      ce_bit,Rtemp      ;set the global capture enable bit (begins digitizing)
       move     Rtemp,@mode move     @initcm,Rcapture,1 ;load initial capture mask
       move     @captmsk,Rloadcap,1 ;load value to reinitialize capture mask movi     black-special,Rblack  ;address of black ("0")

jruc     frame black:
       .long    0,0

.align                     ;align the following code with the I-cache
skpfram:                          ;come here to skip capturing a frame
       callr    synceven
       callr    syncodd

*  Attempt capturing a frame:
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips Page 11 of 18

It is certified that error appears in the above-identified patent and that said Letters Patent is hereby corrected as shown below:

```
frame:
* Count the frame (N.B. We must count every frame seen, whether captured or skipped):
    move    @frames,Rtemp,1
    addk    1,Rtemp         ;count
    move    Rtemp,@frames,1

* Decide whether this is a frame we want, based on capture mask:
    sll     1,Rcapture       ;check next mask bit (it goes to C-bit)
    jmc     skpfram          ;skip this frame if C-bit is zero (last active bit guaranteed to be 1)
    jmz     mskok            ;check if need to reload mask bits: yes->fall thru
    move    Rloadcap,Rcapture ;reload the capture mask (32 bits) for next time
mskok:
* Prepare for "lines" loop:
    move    @vramBase,Rpixel,1
    subi    special,Rpixel,1
*   movi    capture-special,Rpixel ;starting address of video frame bufr (Special space)
    move    Rpixel,Rnext     ;remember address of first line
    move    Rlincnt,Ry       ;get number of lines in frame

* Check video field (s/b ODD from compressing prev frame or from syncodd after hosths or skpfram).
* (N.B. Assumes compression takes more than one field time (~1/60th second), but less than a frame time.)
    callr   syncevck         ;wait for start of even field (i.e. digitizing complete)

* Add 8 lines of black to the top of the picture:
    movk    8,Rtemp2         ;eight groups of one line
blk
    move    Rpixcnt,Rx       ;pixels-per-line / 32
    sll     5-2,Rx           ;calc the loop count ( *32 ^ /4bits-per-loop)
loop2b:
    movb    *Rjstatp,Rtemp   ;read JPEG pixel fifo status
*   move    Rtemp,@Flag,0    ;*debug*
    jmn     loop2b           ;wait until fifo ready (bit7 - 1)
blkloop
    move    Rpixtmp,*Rblack,0 ;each write causes auto xfer(s) to JPEG pixel fifo.
    move    Rpixtmp,*Rblack,0
    move    Rpixtmp,*Rblack,0
    move    Rpixtmp,*Rblack,0
    dsjs    Rx,blkloop       ;1 line of pixels
    dsjs    Rtemp2,blk

* Send frame interrupt to the Mac:
    move    @hstctll,Rtemp   ;get hstctll value
    ori     intout,Rtemp     ;set interrupt bit
    move    Rtemp,@hstctll   ;send to host to indicate frame start

* Start of loop to process all lines of a frame:
lines:
    add     Rline,Rnext      ;calc addr of next line
    move    Rpixcnt,Rx       ;(re)load x count (pixels-per-line / 32)

*   move    @tdelay,Rtemp2,1 ;DEBUG
*loop2d:
*   dsjs    Rtemp2,loop2d    ;DEBUG loop2j:
    movb    *Rjstatp,Rtemp   ;read JPEG pixel fifo status
*   move    Rtemp,@Flag,0    ;*debug*
    jmn     loop2j           ;wait until fifo ready (bit7 - 1)

loop2:
    move    Rpixtmp,*Rpixel,0 ;this write causes auto xfer(s) to JPEG pixel fifo.
    add     Rpxincl,Rpixel    ;now advance to next pixel
    move    Rpixtmp,*Rpixel,0 ;2
    add     Rpxinc2,Rpixel
    move    Rpixtmp,*Rpixel,0 ;3
    add     Rpxincl,Rpixel
    move    Rpixtmp,*Rpixel,0 ;4
    add     Rpxinc2,Rpixel
    move    Rpixtmp,*Rpixel,0 ;5
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
        add     Rpxinc1,Rpixel
        move    Rpixtmp,*Rpixel,0    ;6
        add     Rpxinc2,Rpixel
        move    Rpixtmp,*Rpixel,0    ;7
        add     Rpxinc1,Rpixel
        move    Rpixtmp,*Rpixel,0    ;8
        add     Rpxinc2,Rpixel
        move    Rpixtmp,*Rpixel,0    ;9
        add     Rpxinc1,Rpixel
        move    Rpixtmp,*Rpixel,0    ;10
        add     Rpxinc2,Rpixel
        move    Rpixtmp,*Rpixel,0    ;11
        add     Rpxinc1,Rpixel
        move    Rpixtmp,*Rpixel,0    ;12
        add     Rpxinc2,Rpixel
        move    Rpixtmp,*Rpixel,0    ;13
        add     Rpxinc1,Rpixel
        move    Rpixtmp,*Rpixel,0    ;14
        add     Rpxinc2,Rpixel
        move    Rpixtmp,*Rpixel,0    ;15
        add     Rpxinc1,Rpixel
        move    Rpixtmp,*Rpixel,0    ;16
        add     Rpxinc2,Rpixel
        move    Rpixtmp,*Rpixel,0    ;17
        add     Rpxinc1,Rpixel
        move    Rpixtmp,*Rpixel,0    ;18
        add     Rpxinc2,Rpixel
        move    Rpixtmp,*Rpixel,0    ;19
        add     Rpxinc1,Rpixel
        move    Rpixtmp,*Rpixel,0    ;20
        add     Rpxinc2,Rpixel
        move    Rpixtmp,*Rpixel,0    ;21
        add     Rpxinc1,Rpixel
        move    Rpixtmp,*Rpixel,0    ;22
        add     Rpxinc2,Rpixel
        move    Rpixtmp,*Rpixel,0    ;23
        add     Rpxinc1,Rpixel
        move    Rpixtmp,*Rpixel,0    ;24
        add     Rpxinc2,Rpixel
        move    Rpixtmp,*Rpixel,0    ;25
        add     Rpxinc1,Rpixel
        move    Rpixtmp,*Rpixel,0    ;26
        add     Rpxinc2,Rpixel
        move    Rpixtmp,*Rpixel,0    ;27
        add     Rpxinc1,Rpixel
        move    Rpixtmp,*Rpixel,0    ;28
        add     Rpxinc2,Rpixel
        move    Rpixtmp,*Rpixel,0    ;29
        add     Rpxinc1,Rpixel
        move    Rpixtmp,*Rpixel,0    ;30
        add     Rpxinc2,Rpixel
        move    Rpixtmp,*Rpixel,0    ;31
        add     Rpxinc1,Rpixel
        move    Rpixtmp,*Rpixel,0    ;32
        add     Rpxinc2,Rpixel
        dsj     Rx,loop2             ;loop thru the line move    Rnext,Rpixel         ;load addr of next line to process
        dsj     Ry,lines             ;loop for next line

*       callr   syncodd              ; If we're in odd field, it took too long. .
        jruc    frame

*
* The following routines sync the code to the incoming video fields.
* Note:  Since the status register is not synchronized with the 34010 instruction
*        clock, we must always check that we get the same reading twice in a row.
*
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

```
* Wait for start of next even field; check to make sure field is already ODD at entry.
* (If we enter here in an even field, it means an OVERRUN has occurred.)
syncevck:
s5        move    *Rstatp,Rtemp
          btst    0,Rtemp
          jrz     s5e1           ; if even, go check a second time; fall thru if odd
s5o1      move    *Rstatp,Rtemp
          btst    0,Rtemp
          jrz     s5e1           ; if even, go check a second time; fall thru if odd
s6        move    *Rstatp,Rtemp
          btst    0,Rtemp
          jrnz    s6             ; loop as long as it remains odd
          move    *Rstatp,Rtemp
          btst    0,Rtemp
          jrnz    s6             ; make sure we see it the same twice in a row
          rets                   ; normal successful return at start of an even field

* come here if we found an even value one time:
s5e1      move    *Rstatp,Rtemp  ; perform second test for even
          btst    0,Rtemp
          jrnz    s5o1           ; jump back if second check is okay (odd)
* else, fall thru
* At this point we have an overrun (two evens in a row), so count it
          move    @overrun,Rtemp,1 ; In the even field already... increase overrun count
          addk    1,Rtemp
          move    Rtemp,@overrun,1
s7        move    *Rstatp,Rtemp  ; We know it is even, so now we need to wait for odd
          btst    0,Rtemp
          jrz     s7
          move    *Rstatp,Rtemp
          btst    0,Rtemp
          jrz     s7
          jruc    s6

.end
```

APPENDIX B

EDL

```
TITLE: UNTITLED01
FCM: NON-DROP FRAME
001 050    V      C         04:11:23:21 04:11:37:19 01:00:00:00 01:00:13:28
M2  050           030.0                 04:11:23:21
002 050    V      C         04:03:14:26 04:03:20:01 01:00:13:28 01:00:19:03
M2  050           030.0                 04:03:14:26
003 050    V      C         04:11:37:19 04:11:55:29 01:00:19:03 01:00:37:13
M2  050           030.0                 04:11:37:19
004 050    V      C         04:04:51:01 04:04:56:13 01:00:37:13 01:00:42:24
M2  050           030.0                 04:04:51:01

TITLE: UNTITLED01
FCM: NON-DROP FRAME
001 THEY_C  V     C         04:11:23:21 04:11:37:19 01:00:00:00 01:00:13:28
M2  THEY_C        030.0                 04:11:23:21
002 THEY_C  V     C         04:03:14:26 04:03:20:01 01:00:13:28 01:00:19:03
M2  THEY_C        030.0                 04:03:14:26
003 THEY_C  V     C         04:11:37:19 04:11:55:29 01:00:19:03 01:00:37:13
M2  THEY_C        030.0                 04:11:37:19
004 THEY_C  V     C         04:04:51:01 04:04:56:13 01:00:37:13 01:00:42:24
M2  THEY_C        030.0                 04:04:51:01
```

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Avid Technology, Inc.

Assemble list for edl file picture:

| Seq | first edge | last edge | length | cum | Camera Roll |
|---|---|---|---|---|---|
| /-001 | OPTICAL Number 1 | FADE IN | 1+08 | 1+08 | EFFECT |
| \-002 | end of optical 1 to | scene end | 4+02 | 5+10 | Flat #1 |
| 003 | KJ789876 -1370 +05 | -1372 +05 | 2+01 | 7+11 | Flat #1 |
| /-004 | Scene start to | start of optical 2 | 1+04 | 8+15 | Flat #1 |
| 005 | OPTICAL Number 2 | DISSOLVE | 3+00 | 11+15 | EFFECT |
| \-006 | end of optical 2 to | scene end | 7+05 | 19+04 | Flat #1 |
| 007 | KJ789876 -1236 +02 | -1243 +09 | 7+08 | 26+12 | Flat #1 |
| /-008 | Scene start to | start of optical 3 | 2+04 | 29+00 | Flat #1 |
| \-009 | OPTICAL Number 3 | FADE OUT | 1+08 | 30+08 | EFFECT |
| 010 | LEADER -0000 +00 | -0089 +15 | 90+00 | 120+08 | LEADER |
| /-011 | OPTICAL Number 4 | FADE IN | 1+08 | 122+00 | EFFECT |
| \-012 | end of optical 4 to | scene end | 1+08 | 123+08 | Flat #1 |
| 013 | KH123456 -5085 +05 | -5091 +10 | 6+06 | 129+14 | Flat #1 |
| 014 | KJ789876 -1399 +05 | -1409 +08 | 10+04 | 140+02 | Flat #1 |
| 015 | LEADER -0000 +00 | -0003 +14 | 3+15 | 144+01 | LEADER |
| 016 | KH123456 -5132 +02 | -5142 +04 | 10+03 | 154+04 | Flat #1 |
| 017 | KH123456 -5053 +15 | -5057 +11 | 3+13 | 158+01 | Flat #1 |
| 018 | KH123456 -5083 +00 | -5083 +13 | 0+14 | 158+15 | Flat #1 |
| 019 | KJ789876 -1244 +09 | -1248 +09 | 4+01 | 163+00 | Flat #1 |
| 020 | KJ789876 -1453 +07 | -1464 +11 | 11+05 | 174+05 | Flat #1 |
| /-021 | Scene start to | start of optical 5 | 6+02 | 180+07 | Flat #1 |
| \-022 | OPTICAL Number 5 | FADE OUT | 1+08 | 181+15 | EFFECT |

Avid Technology, Inc.

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Assemble Pull List (scene pull in assemble order) for edl file picture:

| Tapename | Segment Name | first edge | last edge | length | scene |
|---|---|---|---|---|---|
| NAB91COMPILATIONTAPE | Flat #1 | KJ789876 -1441 +15 | -1575 +03 | | 133+05 |
| NAB91COMPILATIONTAPE | Flat #1 | KJ789876 -1368 +13 | -1393 +07 | | 24+11 |
| NAB91COMPILATIONTAPE | Flat #1 | KH123456 -5019 +11 | -5050 +04 | | 30+10 |
| NAB91COMPILATIONTAPE | Flat #1 | KJ789876 -1327 +03 | -1368 +12 | | 41+10 |
| NAB91COMPILATIONTAPE | Flat #1 | KJ789876 -1234 +00 | -1300 +00 | | 66+01 |
| NAB91COMPILATIONTAPE | Flat #1 | KH123456 -5050 +05 | -5082 +15 | | 32+11 |
| NAB91COMPILATIONTAPE | Flat #1 | KJ789876 -1300 +01 | -1327 +02 | | 27+02 |
| NAB91COMPILATIONTAPE | Flat #1 | KH123456 -5083 +00 | -5128 +01 | | 45+02 |
| NAB91COMPILATIONTAPE | Flat #1 | KJ789876 -1393 +08 | -1441 +14 | | 46+07 |
| NAB91COMPILATIONTAPE | Flat #1 | KH123456 -5128 +02 | -5172 +05 | | 44+04 |

Avid Technology, Inc.

Pull list for edl file picture:

| Seq | first edge | last edge | roll | Lab Roll | length | scene | take |
|---|---|---|---|---|---|---|---|
| 004 | KH123456 -5020 +11 | see OPTICAL | 2 | Flat #1 | 1+04 | 1 | 2 |
| 008* | KH123456 -5052 +06 | see OPTICAL | 3 | Flat #1 | 2+04 | 2 | 1 |
| 017* | KH123456 -5053 +15 | -5057 +11 | | Flat #1 | 3+13 | 2 | 1 |
| 018 | KH123456 -5083 +00 | -5083 +13 | | Flat #1 | 0+14 | 3 | 2 |
| 013 | KH123456 -5085 +05 | -5091 +10 | | Flat #1 | 6+06 | 3 | 2 |
| 016 | KH123456 -5132 +02 | -5142 +04 | | Flat #1 | 10+03 | 3a | 1 |
| 007 | KJ789876 -1236 +02 | -1243 +09 | | Flat #1 | 7+08 | 6 | 1 |
| 019 | KJ789876 -1244 +09 | -1248 +09 | | Flat #1 | 4+01 | 6 | 1 |
| 012 | KJ789876 -1305 +03 | see OPTICAL | 4 | Flat #1 | 1+08 | 7 | 1 |
| 006 | KJ789876 -1332 +01 | see OPTICAL | 2 | Flat #1 | 7+05 | 7 | 2 |

UNITED STATES PATENT AND TRADEMARK OFFICE
CERTIFICATE OF CORRECTION

PATENT NO.   : 5,905,841
DATED        : May 18, 1999
INVENTOR(S)  : Eric C. Peters; Patrick D. O'Connor; Michael E. Phillips It is certified that error appears in the above-identified patent and that said Letters Patent is hereby corrected as shown below:

| | | | | | | |
|---|---|---|---|---|---|---|
| 003  | KJ789876 -1370 +05 | -1372 +05      | Flat #1      | 2+01  | 9  | 1 |
| 014  | KJ789876 -1399 +05 | -1409 +08      | Flat #1      | 10+04 | 9  | 3 |
| 021  | KJ789876 -1412 +08 | see OPTICAL 5  | Flat #1      | 6+02  | 9  | 3 |
| 002  | KJ789876 -1447 +03 | see OPTICAL 1  | Flat #1      | 4+02  | 10 | 5 |
| 020  | KJ789876 -1453 +07 | -1464 +11      | Flat #1      | 11+05 | 10 | 5 |
| 010  | LEADER   -0000 +00 | -0089 +15      | 35mm LEADER  | 90+00 |    |   |
| 015  | LEADER   -0000 +00 | -0003 +14      | 35mm LEADER  | 3+15  |    |   |
| 001  | OPTICAL Number 1   | FADE IN        | EFFECT       | 1+08  |    |   |
| 005  | OPTICAL Number 2   | DISSOLVE       | EFFECT       | 3+00  |    |   |
| 009* | OPTICAL Number 3   | FADE OUT       | EFFECT       | 1+08  |    |   |
| 011  | OPTICAL Number 4   | FADE IN        | EFFECT       | 1+08  |    |   |
| 022  | OPTICAL Number 5   | FADE OUT       | EFFECT       | 1+08  |    |   |

Avid Technology, Inc.

Scene Pull List for edl file picture:

| Tapename | Lab Roll | first edge | last edge | length | scene |
|---|---|---|---|---|---|
| NAB91COMPILATIONTAPE | Flat #1 | KH123456 -5019 +11 | -5050 +04 | 30+10 | |
| NAB91COMPILATIONTAPE | Flat #1 | KH123456 -5050 +05 | -5082 +15 | 32+11 | |
| NAB91COMPILATIONTAPE | Flat #1 | KH123456 -5083 +00 | -5128 +01 | 45+02 | |
| NAB91COMPILATIONTAPE | Flat #1 | KH123456 -5128 +02 | -5172 +05 | 44+04 | |
| NAB91COMPILATIONTAPE | Flat #1 | KJ789876 -1234 +00 | -1300 +00 | 66+01 | |
| NAB91COMPILATIONTAPE | Flat #1 | KJ789876 -1300 +01 | -1327 +02 | 27+02 | |
| NAB91COMPILATIONTAPE | Flat #1 | KJ789876 -1327 +03 | -1368 +12 | 41+10 | |
| NAB91COMPILATIONTAPE | Flat #1 | KJ789876 -1368 +13 | -1393 +07 | 24+11 | |
| NAB91COMPILATIONTAPE | Flat #1 | KJ789876 -1393 +08 | -1441 +14 | 48+07 | |
| NAB91COMPILATIONTAPE | Flat #1 | KJ789876 -1441 +15 | -1575 +03 | 133+05 | |

UNITED STATES PATENT AND TRADEMARK OFFICE
CERTIFICATE OF CORRECTION

PATENT NO. : 5,905,841
DATED : May 18, 1999
INVENTOR(S) : Eric C. Peters; Patrick D. O'Connor; Michael E. Phillips It is certified that error appears in the above-identified patent and that said Letters Patent is hereby corrected as shown below:

Avid Technology, Inc.

Negative Dupe list for edl file picture:

| Seq | first edge last edge | dupe negative start dupe negative end | scene take | roll |
|---|---|---|---|---|
| 008 | KH123456 -5052 +06 -5054 +09 | KH123456 -5052 +06 KH123456 -5057 +11 | 2 1 | Flat #1 |
| 017 | KH123456 -5053 +15 -5057 +11 | | 2 1 | Flat #1 |
| 009 | OPTICAL Number 3 | KH123456 -05054 +10 KH123456 -05056 +07 | 2 1 | Flat #1 |

Avid Technology, Inc.

Optical effects list for EDL file picture:      (5 effects)

Num: 001          Type: Fade-in          Length:   1+08   (24 frames)
Cut: 001
Edl: 001          OUT:                   IN:
                  ---                    --
                  Roll: BLACK            Roll: Flat #1
                  Scene:                 Scene: 10
                  Take:                  Take:  5

Scene start:    BLACK
FADE start:     BLACK                    KJ789876 -01445 +11
FADE center:    BLACK                    KJ789876 -01446 +06
FADE end:       BLACK                    KJ789876 -01447 +02
Scene end:                               KJ789876 -01451 +05

---

Num: 002          Type: Dissolve         Length:   3+00   (48 frames)
Cut: 005
Edl: 004          OUT:                   IN:
                  ---                    --
                  Roll: Flat #1          Roll: Flat #1
                  Scene: 1               Scene: 7
                  Take:  2               Take:  2

Scene start:    KH123456 -05020 +11
DSLV start:     KH123456 -05021 +15      KJ789876 -01329 +01
DSLV center:    KH123456 -05023 +06      KJ789876 -01330 +08
DSLV end:       KH123456 -05024 +14      KJ789876 -01332 +00
Scene end:                               KJ789876 -01339 +05

UNITED STATES PATENT AND TRADEMARK OFFICE
CERTIFICATE OF CORRECTION

PATENT NO.   : 5,905,841
DATED        : May 18, 1999
INVENTOR(S)  : Eric C. Peters; Patrick D. O'Connor; Michael E. Phillips It is certified that error appears in the above-identified patent and that said Letters Patent is hereby corrected as shown below:

```
Num: 003          Type: Fade-out          Length:   1+14   (30 frames)
Cut: 009
Edl: 007          OUT:                    IN:
                  ---                     --
                  Roll: Flat #1           Roll: BLACK
                  Scene: 2                Scene:
                  Take:  1                Take:

Scene start:      KH123456 -05052 +06
FADE start:       KH123456 -05054 +10     BLACK
FADE center:      KH123456 -05055 +08     BLACK
FADE end:         KH123456 -05056 +07     BLACK
Scene end:                                BLACK Num: 004          Type: Fade-in           Length:   1+08   (24 frames)
Cut: 011
Edl: 008          OUT:                    IN:
                  ---                     --
                  Roll:  BLACK            Roll: Flat #1
                  Scene:                  Scene: 7
                  Take:                   Take:  1

Scene start:      BLACK                   KJ789876 -01303 +11
FADE start:       BLACK                   KJ789876 -01304 +06
FADE center:      BLACK                   KJ789876 -01305 +02
FADE end:         BLACK                   KJ789876 -01306 +10
Scene end:
-----------------------------------------------------------------

Num: 005          Type: Fade-out          Length:   1+14   (30 frames)
Cut: 022
Edl: 017          OUT:                    IN:
                  ---                     --
                  Roll: Flat #1           Roll: BLACK
                  Scene: 9                Scene:
                  Take:  3                Take:

Scene start:      KJ789876 -01412 +08
FADE start:       KJ789876 -01418 +10     BLACK
FADE center:      KJ789876 -01419 +08     BLACK
FADE end:         KJ789876 -01420 +07     BLACK
Scene end:                                BLACK
```